Sept. 12, 1950  M. F. BATES  2,521,684
ROTARY WING AIRCRAFT
Filed Aug. 10, 1944  4 Sheets-Sheet 1

INVENTOR
MORTIMER F. BATES
BY
Herbert R. Thompson
his ATTORNEY.

Sept. 12, 1950 M. F. BATES 2,521,684
ROTARY WING AIRCRAFT

Filed Aug. 10, 1944 4 Sheets-Sheet 4

INVENTOR
MORTIMER F. BATES
BY
Herbert H. Thompson
his ATTORNEY.

Patented Sept. 12, 1950

2,521,684

UNITED STATES PATENT OFFICE 2,521,684

ROTARY WING AIRCRAFT

Mortimer F. Bates, Brooklyn, N. Y., assignor to The Sperry Corporation, a corporation of Delaware Application August 10, 1944, Serial No. 548,843

15 Claims. (Cl. 244—17.11)

This invention relates generally to rotating wing type aircraft, and particularly concerns supporting and control apparatus for the rotor blades as well as their arrangement in the craft. Some features of the invention relate to the control of the pitch of the rotating blades to control the attitude and motion of helicopter or direct lift type aircraft.

In most helicopters, the rotatable airfoil section blades forming a lifting rotor have been supported by a hub assembly carried at the end of a drive shaft extending upwardly from the body of the aircraft. In these prior constructions, the drive shaft serves a dual function. It rotates the blades and also supports the entire load of the aircraft as it is suspended from the rotor during flight. In flight, helicopters of this type have their entire load, including the power plant, passengers, etc., suspended from a single point, namely, the connection of the drive shaft to the rotor hub assembly.

Since the rotating blades are usually connected by at least two pivot joints to permit flapping and dragging movements during their rotation, the suspension of the body of the aircraft below the rotor has pendulous effects, rendering the control of the aircraft particularly sensitive to air currents and disturbances because the hinge points of the blades are close to the axis of rotation. In current designs the plane of rotation of the blades may tilt in a windgust without the instant knowledge of the pilot because of the short radial center distances of the blade hinges. For this reason, the pilot must devote constant attention to the operation of the aircraft to maintain level flight in the absence of some automatic control, such as that disclosed in application Serial No. 593,948, filed July 31, 1945, in the name of the instant inventor, and assigned to the assignee of the present invention.

The rotor hub assembly at the end of the drive shaft is usually a mass of control levers, links and damping cylinders connecting the blades to the drive shaft. All of these mechanisms must be concentrated in a relatively small space, including the connections of the rotor blades to the drive shaft. Since these connections must be made within the hub assembly, there is a limit to the number of blades that can be used.

Although the rotor blades have a high tip speed, the innermost portions of the blades contribute very little to supporting the craft, because the lift is a function of the air speed of the blade and the air speed of the inner portion of the blade approaches zero. Thus, there is a dead area at the inner portion of the rotor, which does not contribute to the lift of the aircraft. Furthermore, the effective lift of the blade varies from minimum to maximum along each blade. This variation in lift results in a very steep gradient in the lift distribution which contributes to the low efficiency of the rotating blades.

It is a major object of the present invention to provide an improved aircraft, particularly of the helicopter type, which overcomes the difficulties of machines heretofore used.

A particular object of the invention is to provide a substantial and reliable bearing structure by which the load is suspended from the rotor blades.

A special object of this invention is to provide, in a helicopter, a rotor blade assembly which is housed and mounted for rotation in the periphery of the fuselage, and, more particularly, in the main annular horizontal framing member of the helicopter.

Another object of this invention is to provide, in a helicopter, a rotor blade assembly having blades of effective aerodynamic characteristics throughout their span.

A further object of this invention is to provide, in a helicopter, a rotor blade assembly whose plane of gyration passes through the fuselage.

Another object of the invention is to improve aerodynamic stability and reduce the inertia moment for control purposes by placing the center of gravity of the craft at or near the point of coincidence of the plane of gyration and the vertical axis of the wing system, but preferably subjacent to horizontal plane of the wing system.

A further object of the invention is to provide better visibility in operating the aircraft, particularly increasing the visibility in an upward direction.

A further object is to provide an aircraft permitting persons to escape from the body of the aircraft by parachute through an emergency exit above the rotor when altitude permits.

Another important object of the invention is to provide attachment room for a larger number of blades than is possible with the usual construction to increase the solidity ratio, that is the ratio of the blade area to the disk area for the rotating blades, thereby increasing the effective lift of the rotor assembly without increasing interference or induced drag.

A still further object of the invention is to eliminate that portion of the rotating blades heretofore occupying the dead area near the center of the rotor, thereby producing more uniform lift distribution along the blade.

Other objects and advantages of the invention, particularly with regard to the arrangement and correlation of the various parts, will become apparent from the following description, taken in connection with the accompanying drawings wherein:

In accordance with the invention, the aircraft has a main body portion for carrying the power plant, including a pilot compartment for the operator and passengers. The pilot compartment has a transparent dome-shaped cover providing unlimited visibility upwardly from the craft. This dome may be divided up into windows by suitable framing. One frame may provide an emergency exit. Surrounding this pilot compartment is a channeled, circular framing member and rotor housing on which the frame of the body is secured. Secured in this main framing member and concentric therewith is a circular hanger having a track face engageable by rollers mounted on a rotatable blade support. A plurality of rotor blades are supported by universal connections to the rotatable blade support. The universal connections provide for flapping and dragging movements of the blades. Since these universal connections are arranged at a substantial radius from the vertical axis of rotation (e. g. three to five feet), a powerful couple is produced by centrifugal force to cause the ring to follow the tilt of the plane of rotation of the blades without appreciable lag.

The hanger and its integral track and blade-supporting ring are so arranged that during flight the hanger is suspended by the ring which, in turn, is supported by the rotating blades. In order to control operation of the aircraft, an oscillatable blade pitch control ring is arranged coaxially with the rotating ring and the hanger. A pitch control member controls axial tilt movements of this ring to adjust the pitch of the rotating blades simultaneously. A joystick within the pilot's compartment adjusts the tilt of the axis of the control ring with respect to the axis of rotation of the rotating blades to cyclically vary the pitch of the blades as they are rotated with respect to the body.

Figure 1:
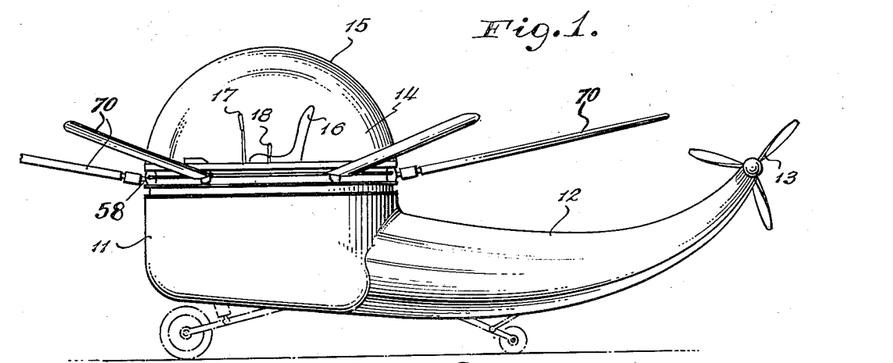
Fig. 1 is a side elevation of a helicopter constructed according to the invention.
Figure 2:
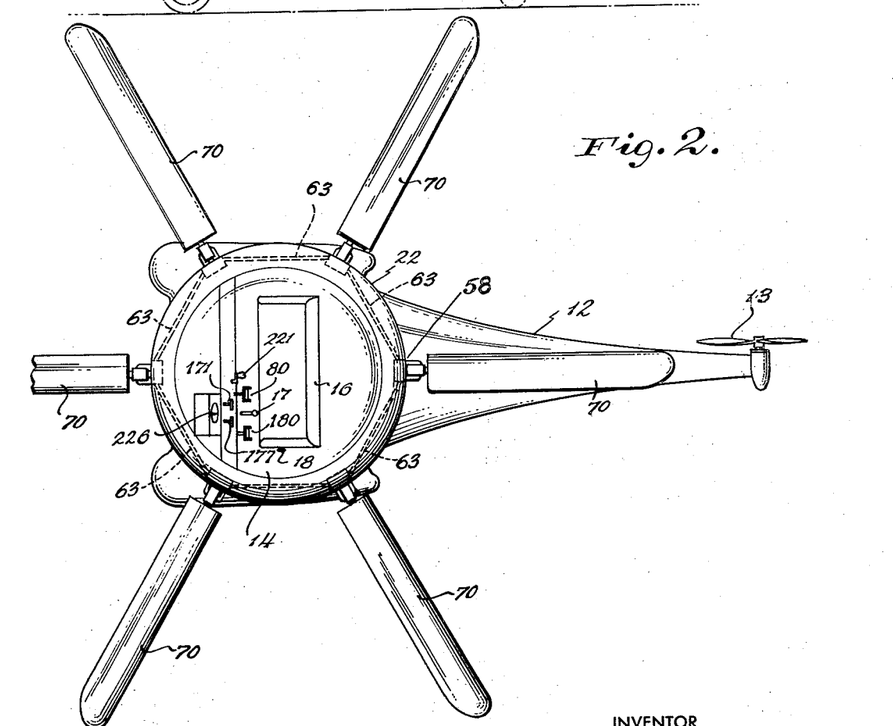
Fig. 2 is a top plan view of the helicopter shown in Fig. 1.

Figs. 1 and 2 illustrate the general arrangement of a helicopter embodying the invention. In these figures, the helicopter is shown having a fuselage or main body portion 11 and a tail portion 12 projecting rearwardly from the body portion to support a torque compensating rotor 13. A pilot compartment 14, directly above the main body portion 11, has a transparent dome-like cover 15 which may be formed of one piece of molded transparent plastic material or may have a plurality of panels with suitable connecting framework. A seat 16 may be located within the pilot compartment 14 for carrying the pilot and other passengers, if desired. Joystick 17 and pitch control lever 18 are arranged adjacent to seat 16 where they are readily accessible to the pilot.

Figure 3:
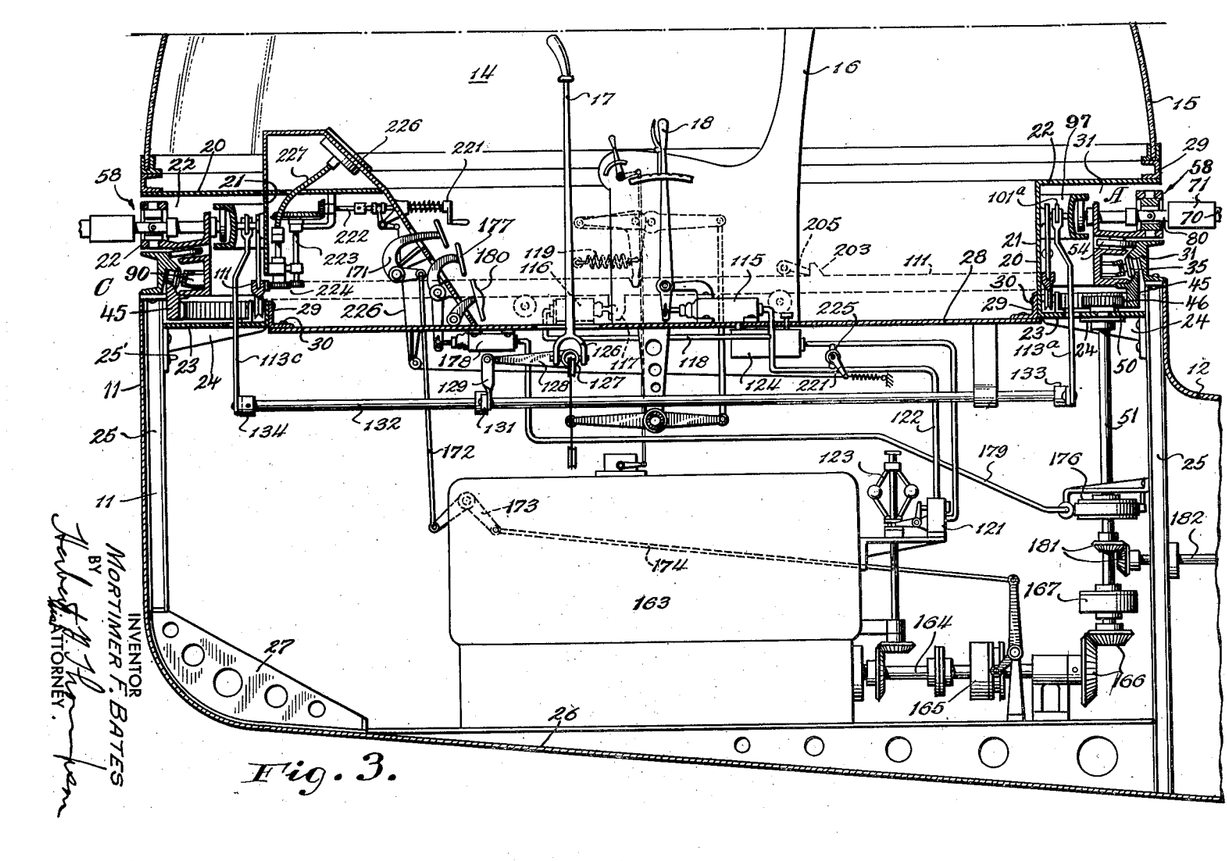
Fig. 3 is an enlarged partial vertical section taken through the longitudinal axis of the structure shown in Figs. 1 and 2.

In the novel helicopter construction herein, and as shown more in detail in Fig. 3, the fuselage or main body 11 is mounted on, or rather depends from a main structural framing member 20. This member is generally annular and of channel shape, having an inner wall 21, top wall 22, and a bottom wall 23, forming an outwardly opening annular chamber, recess, or shelf, whose function as a rotor housing will be adverted to more in detail hereinafter. The annular channel 20 serves as a support for a plurality of brackets 24 subjoined thereto and secured to the bottom web 23 in any suitable manner. The brackets 24 serve to support a plurality of stanchions or vertical ribs 25, of suitable size and shape, usually I-beam shape, as here shown. These stanchions or vertical framing members are secured to the brackets 24, in any suitable manner, as by means of rivets 25'. The bottom longitudinal framing members 26 of the fuselage may be secured to the vertical framing members in the usual manner as by means of angular plates or knees 27. The surface of the fuselage may be formed in any suitable manner over the framing members, and the skin or surface will be indicated generally by the numeral 11. As will be seen, the channel-shaped annulus 20 serves as a rigid frame and supporting member for the helicopter structure, as well as a housing for the rotor structure and its controls. Because of its cross section, it imparts a maximum of physical strength to the assembly with a minimum of weight.

The pilot's compartment or cockpit will have a flooring 28 suspended from framing member 20 by angular brackets 29 secured to the inner face 21 by rivets 30.

The helicopter construction herein is characterized by a special annular rotor, housed in member 20, spaced blades 70 being mounted on and carried by the rotor. To provide for proper mounting of the power members, a special structural assembly is made use of. A channel-shaped member 31 is formed as an annulus and is provided with flanges 32, 33 and a continuous rear rib 34. The rib 34 has a bearing surface 34a formed thereon and riding on rollers 35, which ride on bearing surface 49. The upper rear edge of the member has a second bearing surface 36 formed in place. The member 31 conforms in shape to the perimeter of the upper edge of the fuselage 11, and will be generally circular, as shown. This member is secured to the framing members 25 by rivets 37.

An inturned annular U-channel 38 is mounted on the upper face 22 of the combination rotor housing and framing member 20, coextensive with the perimeter thereof, to serve as a circular frame member for supporting the dome 15. The latter may be set or mounted in a circular frame 39 having a dome-receiving channel 40, the frame 39 being secured to the member 38 in any desired manner.

The special rotor assembly for mounting the blades 70 comprises a continuous everted channel, annulus, or ring 41, having an inner surface or web 42, top flange 43, and a bottom flange 44. Subjoined to this member, at the outer edge of flange or bottom wall 44, is a ring gear 45 having an internal gear face 46. The ring 45 is provided with an inner bearing flange or rib 47 secured to flange 44 by rivets or bolts 48. A second bearing surface 49 is formed as a continuation of the upper surface of member 45. The ring gear 45 is adapted to be driven through pinion 50 meshing with the internal gear 46. The pinion 50 is mounted for rotation on shaft 51, which is bushed in bearing 52 formed in flange 23 of the main framing member 20. The members 41 and 45 have been described as separately formed, and secured together in unitary cooperative relation by bolts 48. However, members 41 and 45 may be cast or formed integrally as a unit and of any suitable metal.

Secured to the rotor ring 41 and integral therewith, are a plurality of rotor blade supports. These structures include a plurality of bridging sections 53 forming sockets for journalling guide rollers 54. A flange or web 55 is formed at the rear and essentially as an upper continuation of the rear wall 42 of the ring or channel 41. The bridge or platform 53 is laterally extended at its outer aspect, as indicated at 56, 57, to form a mounting for a blade-mounting support, yoke or ring member 58 having side walls 59, 60, and a top wall or brace 61. The side wall 60 has a bracket or extension as a side bracket 62. The members 58 may be braced between themselves by means of rods 63 socketed in bearings 64 on the sides of the said members. These members 63 serve to stiffen the assembly laterally by forming an annulus or brace coaxial with rotor ring 41 and secured thereto in vertical spaced relation by yoke 58. The members 63 are effective, as tension members, to prevent distortion of rotor ring 41 by the centrifugal forces developed in the rotating assembly, which forces are dynamically concentrated at the points of blade attachment.

In order to permit dragging and flapping movements of the blade, a blade socket 71 for the blade 70 is carried by a universal joint 72. The blade-mounting support or universal joint 72 is mounted in bearings 74 and 75 to permit movement of the blade about a vertical or drag axis. Damping or drag oscillations is provided by suitable hydraulic dampers 76, 76 connected between each of the blade sockets 71 and portions 56 of the supporting wing 53. A yoke 77 is pivotally connected to the ring 59 by bearings 78 and 79 to permit movement of the blade 70 about a horizontal or flap axis. The socket 71 is adapted to receive root portion 80 of the blade 70 and may be provided with a suitable needle bearing 81 and thrust bearing 82 to carry the centrifugal load of the wing 70 during rotation. The root portion 80 of the blade 70 is rotatable within the socket 71 about the longitudinal axis of the blade 70 in order to control the pitch of the blades by mechanism hereinafter described.

As noted, a suitable guide roller 54 is journaled between the supporting ring 51 and its blade supporting arm 53 to act as a guide roller by engaging bearing surface 36 formed on a sloping portion of the circular track 31. The canted axis of the guide roller 54 and the slope of bearing surface 36 are arranged to take the load of the blades and the supporting ring assembly when the lift of the rotor is removed as, for example, when the entire machine is resting on the ground.

As already mentioned, the aircraft is provided with a plurality of rotating blades 70, and each has an identical socket carried by a universal joint on an arm extending from the blade supporting ring 41. Rotatable bearing connection between the blade supporting ring 41 and the circular track 31 is provided by a number of rollers, such as rollers 35, which are journaled in a floating ring 90 which acts as a cage for the rollers 35.

The number of rollers 35 on the floating ring 61 depends, of course, upon the load to be carried and the diameter of the circular track 31. For average requirements of passenger-type helicopters, about 40 of these rollers 35 are spaced around the circumference of the floating ring 90.

During flight, the supporting ring 41 is carried by the blades 70, 70 and the rollers 35 provide a bearing surface to permit rotation of the supporting ring 41 on the circular track 31 and also form a suspension for the frame 31 from the supporting ring 41. It will be apparent from an inspection of the drawings that during flight all of the members of the blade supporting structure are in stressed tension which is, of course, desirable from the structural standpoint, since it enables the use of lighter weight materials for the forces involved. During tilting of the disk defined by the rotating blades, the centrifugal force of the blades, acting at diametrically opposed points on the supporting ring 41, causes the supporting ring and the remainder of the aircraft to follow tilting of the disk without appreciable lag.

As previously mentioned, tension members 63 are connected between the projecting portions of the various supporting arms 53. These tension members, as may be seen most clearly in Fig. 2, provide a complete loop connecting all of the rotating blades 70, 70. With this arrangement, the centrifugal forces of the blades are counterbalanced against each other in the plane of the supporting ring 41, so the radial force on the actuating arms 53 as well as the supporting ring 41, due to the centrifugal forces of the blades 70, is a minimum. The only forces exerted on the supporting ring 41 are those due to the driving torque for rotating the blades and the tension due to the load suspended from the circular track 31 and carried by the main body 11.

In order to drive the ring gear 46 for rotating ring 41 and translating blades 70, 70, in rotation, a power plant in the form of an internal combustion engine 163 has a drive shaft 164 operating through a clutch 165, gearing 166 and over-running clutch 167 rotates rotor drive shaft 51 which turns pinion 50, meshing with the ring gear 46. The clutch 165 is operable by a suitable foot-pedal 171 in the pilot's compartment 14 through linkage 172, 173, 174 for coupling and uncoupling the drive shaft 51 when desired. A brake 176 is arranged to stop rotation of the blades by braking drive shaft 51 through operation of pedal 177 in the pilot compartment 14, which actuates hydraulic brake cylinder 178 that is connected to the brake 176 by suitable conduit 179. The overrunning clutch 167 is inserted in the driving system to permit the blades to exceed the speed of the rotor as in the case of autorotation.

In order to maintain the position of the main body 11 stationary, it is necessary, as is well known, to compensate for precession caused by the torque applied to the rotor blades through the drive shaft 51. For this purpose, the torque compensating propeller 13 (Fig. 1) is driven by suitable gearing 181 (Fig. 3) from the shaft 51 which operates shaft 182 that is connected to the propeller 13. The pitch of the torque compensating propeller may be controlled through operation of conventional foot pedals shown in outline at 180.

Particularly, in helicopter types of craft, it is necessary to control the pitch of the blades during their rotation. The vertical movements of the craft are controlled by simultaneously adjusting the pitch of all the blades, whereas attitude changes and lateral movements are controlled by causing cyclical variations in the pitch of the blades as they rotate. As was previously stated, the root 80 of each of the airfoil section blades 70, 70 is rotatable about is spanwise axis in socket 71 for controlling its pitch. The root 80 is connected through a universal joint 91 to a pitch control shaft 92, journaled at 93 in the flange 55 formed on the inner end of the supporting arm 53 and extending upwardly from the supporting ring 41. One end of a lever 95 is keyed to the end of the shaft 92 and its other end carries a roller 96 in engagement with channel shaft control ring 97. The spanwise axes of the blades will be seen to radially intersect the control ring 97. It will be apparent that axial movements of the control ring 97 will cause movements of the lever 95, thereby turning the pitch control shaft 92 which operates through universal joint 91 to turn the root 80 of the blade 70, thereby changing the pitch of the blade.

Figure 5:
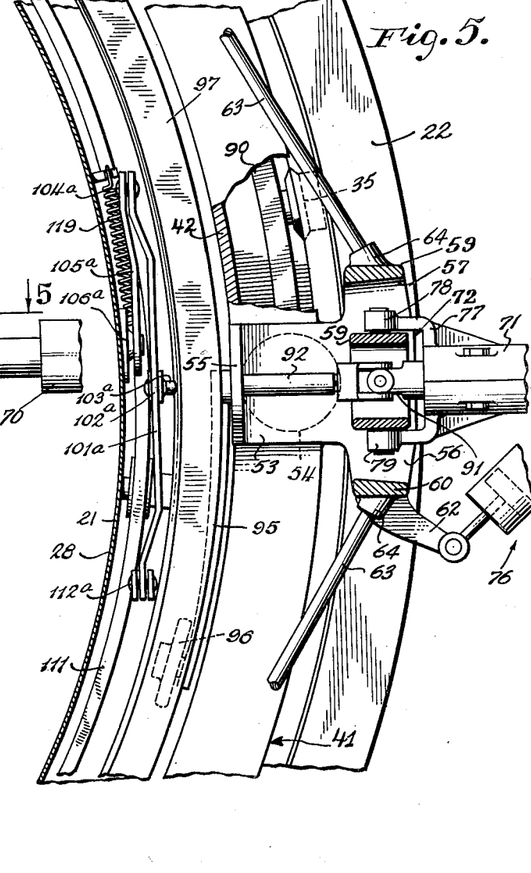
Fig. 5 is a horizontal section taken on the line of 5—5 of Fig. 4, with some parts broken away for purposes of clearness.
Figure 6:
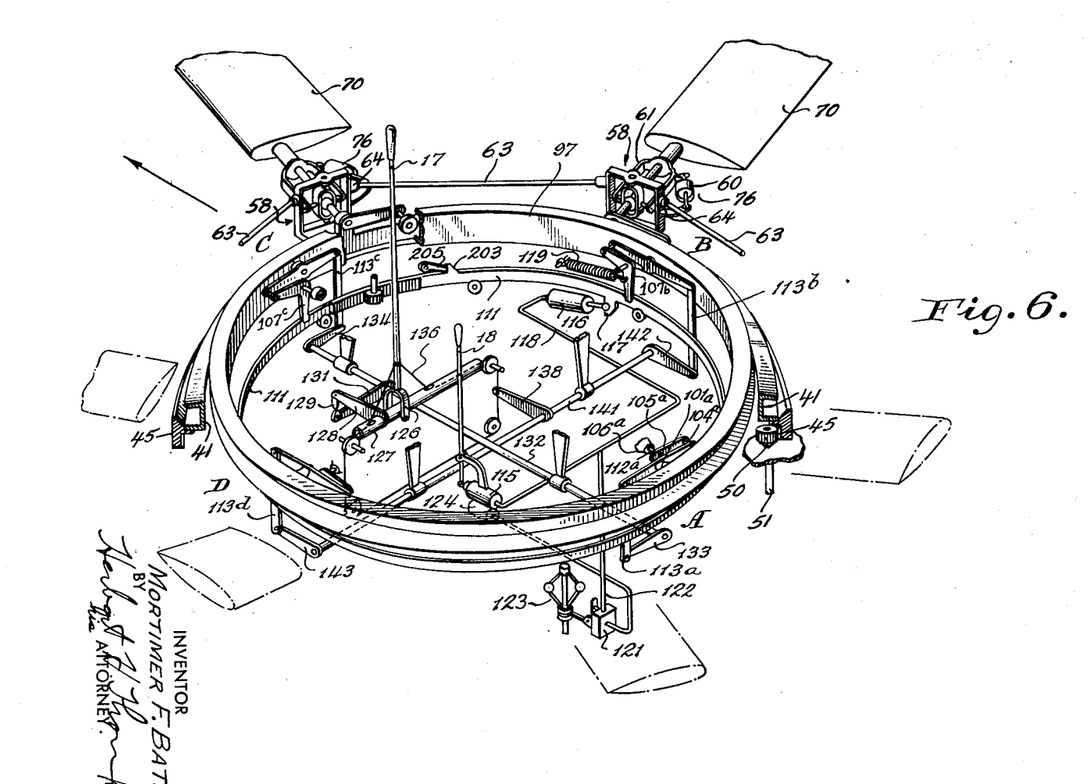
Fig. 6 is a schematic illustration showing the arrangement of the various controls for adjusting the pitch of the rotating blades.

As shown most clearly in Fig. 6, the attitude control ring 97 is supported at four different points A, B, C and D around the circumference of the ring. As will appear, these various supporting positions permit axial movement of the ring to simultaneously change the pitch of all the blades and also permit tilting of the axis of the ring about longitudinal and athwartship axes to cause cyclical variations in the pitch of the blades as they rotate. The structure shown in Figs. 3, 4 and 5 corresponds to position A of Fig. 6. It will be understood that each of the supporting positions for the attitude control ring 97 has a corresponding structure and the various elements will be designated by corresponding reference numerals.

At position A (Figs. 4 and 5), the attitude control ring 97 is pivotally connected to the center of a lever 101a by a ball joint 102a that is affixed by a stud 103a to the ring 97. One end of the lever 101a is connected as by pivot 104a to an arm 105a of a bellcrank that is rotatably secured to the frame member 21 by a joint 106a and has its other arm 107a formed with a tooth 108a that engages a notch 109a formed in a circular pitch control rim 111.

Figure 4:
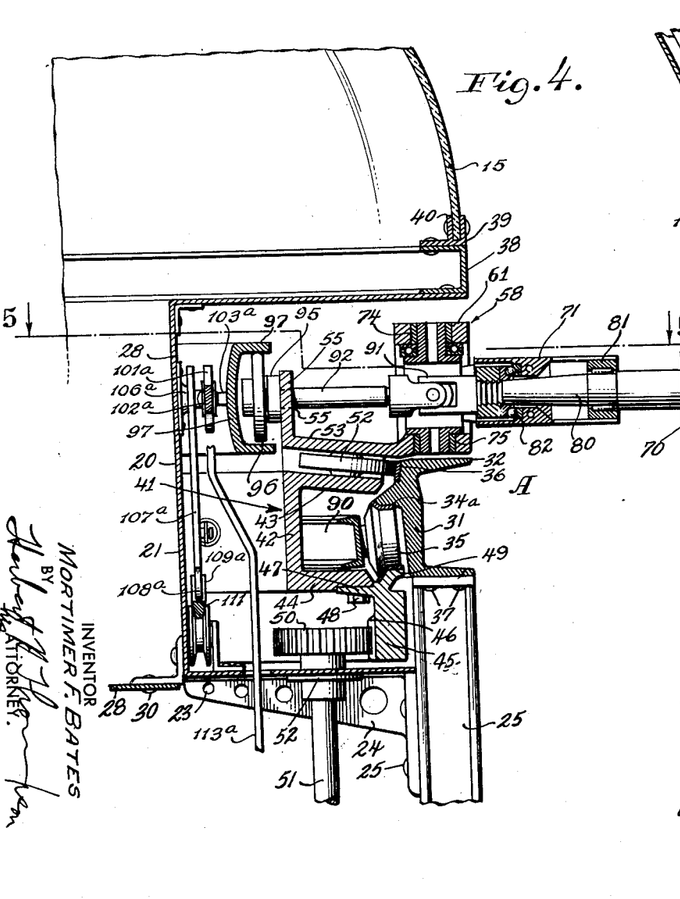
Fig. 4 is an enlarged view of the blade supporting structure shown in Fig. 3.

The other end of the lever 101a is connected by pivot 112a to a link 113a that is adjusted upwardly and downwardly by the joystick 17. It will be apparent from the foregoing that the position of the ball joint 102a is controlled jointly by the position of arm 105a of the bellcrank and link 113a which is controlled by the joystick.

Assume for the moment that the link 113a is held rigid by the joystick. When the circular pitch control rim 111 is turned, notch 109a engages tooth 108a to move the bellcrank, thereby raising the pivot connection 104a which, in turn, lifts the lever 101a and the ball joint 102a, causing the control ring 97 to be raised at position A. When the control ring is thus raised, the wheel 96 moves lever 95 which turns pitch control shaft 92 in a manner to reduce the pitch of the blade.

Similarly, rotation of the rim 111 in the opposite direction operates through the same mechanism to increase the pitch of the blade 70. As may be seen in Fig. 6, the bellcranks at each of the positions A, B, C and D are controlled simultaneously by rotation of the pitch control rim 111. Thus, all points of the control ring 97 are raised and lowered simultaneously, so the pitch of each of the blades 70, 70 is decreased or increased simultaneously. The pitch control rim 111 is operated hydraulically from a pump 115 that controls a hydraulic cylinder 116, the piston of which is connected to a projection 117 on the rim 111. Movement of the control lever 18 displaces the hydraulic fluid in pump 115 which operates through connecting conduit 118 to displace a piston in hydraulic cylinder 116, thereby moving the arm 117 in a direction to lower the control ring 97 and increase the pitch of the blades 70, 70. Since the pump 115 and cylinder 116 are single acting hydraulic mechanisms, a spring 119 is connected to one of the bellcranks for moving the control rim 111 in the opposite direction when the pressure from the hydraulic pump 115 is relieved by returning pitch control lever 18 to its original position.

This hydraulic arrangement is particularly advantageous, in that it permits blades 70, 70 to be feathered immediately upon failure of the power from the motor 163, thereby providing a safety feature in automatically causing autorotation of the helicopter blades in the event of a power failure. To accomplish this automatic control, a by-pass valve 121 is connected as by conduit 122 to conduit 118 between the pump 115 and motor 116. The by-pass valve 121 is controlled by suitable governer 123 that opens the valve to by-pass hydraulic fluid from pump 115 to sump 124 when power from the motor 163 fails. This permits spring 119 to move rim 111 until stop 203 on the rim 111 engages latch 205. When the rim 111 is in this position, the rotor blades are set at a predetermined pitch to permit auto-rotation. The latch may be released when it is desired to reduce the pitch of the blades below the auto-rotation setting.

In the event the hydraulic system is not operating properly, emergency pitch control crank 221, normally disengaged from shaft 222, may be operated to turn the pitch control rim 111 through shaft 223 and gearing 224. To prevent the hydraulic system from locking the rim 111 during manual operation, a second by-pass valve 225 is operated by flexible cable 226 when crank 221 is depressed to engage shaft 222.

The apparatus for simultaneously controlling the pitch of all the blades has just been described in connection with the mechanism operated by the pitch control lever 18 through pitch control 111 and the control ring 97. Since the position of rim 111 corresponds to the pitch of the blades, the pitch may be indicated on a pitch meter 223 having its indicator connected by flexible shaft 227 and gearing 224 to the rim 111. Cyclical pitch variations of the blades are controlled by the position of joystick 17 that is universally mounted by a yoke 126 that is pivoted on rotatable shaft 127.

Fore and aft movements of the joystick 17 cause turning movements of the shaft 127 which turns lever 128 that is connected by link 129 to lever 131 keyed to shaft 132. At the rear end of shaft 132 there is arranged a lever 133 that is pivotally connected to the link 113a which is connected to one end of the lever 101a and operates jointly with arm 105a to control the position of ball joint 102a that, in turn, positions the control ring 97.

Referring now to Figs. 3 and 6, it may be seen that a lever 134 is keyed to the forward end of the shaft 132 and is pivotally connected to a link 113c at position C corresponding to the link 113a at position A. The levers 133 and 134 are oppositely arranged on the shaft 132 so rotation of the shaft 132 by fore and aft movements of the joystick 17 causes the links 113a and 113c to move in opposite directions, so the central axis of the control ring 97 is tilted fore and aft in a direction opposite to the direction of movement of the joystick 17.

Assuming that the athwartship positions of the control ring 97 are unchanged for the moment, it will be apparent that tilting of the central axis of the control ring 97 by fore and aft movements of the joystick 17 will cause the blades 70, 70 to vary in pitch as they rotate around the control ring 97, because one portion of the control ring will be lower and another portion higher than the athwartship positions with respect to the supporting ring 41. If the joystick 17 is moved forward, the pitch of the blades 70, 70 will be greater as they pass position A and less as they pass position C than the pitch of the blades at positions B and D. As is well known, this pitch condition will initiate forward motion of the craft.

In order to provide cyclical pitch variations about the athwartship axis, joystick 17 is connected as by continuous cable 136 to lever 138 which is keyed on shaft 141. A lever 142 is keyed to the end of the shaft 141 adjacent position B and is pivotally connected to a link 113b corresponding to the link 113a of position A. Similarly, a lever 143 is keyed to the end of shaft 141 adjacent position B and is pivotally connected to link 113d corresponding to the link 113a. As the joystick 17 is moved transversely of the longitudinal axis of the aircraft, it causes turning of the shaft 141 which operates to reversely acting levers 142 and 143 to move the links 113b and 113d in opposite directions, thereby raising one side of the ring 97 and lowering the other side to cause cyclical variations in the pitch of the blades 70, 70 about the athwartship axis. In this manner, the axis of the control ring is again tilted in the opposite direction to the direction of movement of the joystick.

In operation, the motor 163 drives through pinion 50 and ring gear 46 to turn supporting ring 41 that is rotatably connected to track 31 by rollers 35 forming a rotatable bearing surface. As the ring 41 rotates, it carries the blades 70, 70 in rotation with respect to the body 11 of the aircraft. The motor 163 also drives through shaft 182 to turn torque compensating propeller 13. With the rotor and torque compensating propeller thus turning, the pitch control lever 18 is adjusted to turn the pitch control rim 111 which operates through the bellcranks to simultaneously lower all of the supporting levers for the ring 97, thereby simultaneously increasing the pitch of all the blades 70, 70.

The blades 70, 70, that are mounted by universal joints 72 on the supporting ring 41, and lift the same, which, in turn, acts through rollers 35 to lift the entire body 11. The load of the body 11 is thus distributed around the periphery of the supporting ring and applied to the stub blades 70, 70 at a point where they have appreciable lift, since the air speed of the rotating blades at their roots 80, 80 is considerably greater than at the centric hub of the blades on helicopters heretofore used.

In order to cause lateral movements of the aircraft, the pitch of the blades is cyclically varied during rotation by adjusting the position of the joystick 17. The joystick 17 is moved in the direction of the desired lateral motion and such movement operates through the links 113a, 113b, 113c and 113d to adjust the position of the levers supporting the ring 97 to tilt the axis of the ring 97 in the opposite direction to the direction of movement of the joystick 17. This tilting of the axis of the control ring 97 with respect to the axis of rotation of the assembly 70, 70 causes cyclical variations in the pitch of the individual blades as they turn about the control ring 97.

As is well known in helicopters, cyclical pitch is used to produce lateral movements of the aircraft. In the event of power failure, the governor 123 causes pitch control mechanism to reduce the pitch of all the rotating blades to a preset auto-rotating position immediately, thereby permitting the helicopter to auto-gyrate to a safe landing.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a helicopter, rotor supporting apparatus comprising a circular track mounted in a housing formed as a horizontal annular peripheral chamber in the body of the helicopter, a rotor blade assembly supporting ring mounted for rotation wholly within said chamber and arranged concentric with said track, a plurality of concentric universals circumferentially spaced uniformly about said ring for pivotally supporting a plurality of airfoil section blades on flap and drag axes to form a sustaining rotor, and bearing means for suspending said track from said ring and permitting relative rotation therebetween.

2. In a helicopter as claimed in claim 1, a rotor blade assembly in which the periphery of the supporting ring is spaced radially substantially one-third of the distance from the axis of rotation to the tip of the blades and the axial length of the blades is substantially two-thirds of said distance.

3. A rotor blade assembly according to claim 1 in which the pivotal supports for the air foil section blades are mounted for uniplanar rotation wholly within the periphery of the body of the helicopter and in a common horizontal plane perpendicular to the diametric vertical axis of the helicopter, the center of gravity of the machine being below the plane of gyration.

4. In a helicopter, a fuselage, a channeled, annular peripheral framing member at the top of the fuselage and forming a housing, a rotative wing assembly disposed for concentric rotation about the fuselage and in the plane of the peripheral housing and a rotor supporting apparatus comprising a fixed circular track concentrically mounted in said peripheral housing and secured to the helicopter, a rotatable blade assembly supporting frame in said housing arranged concentric with said track, a plurality of equiangular blade supports formed on and circumferentially spaced about said ring for carrying a plurality of airfoil section blades extending radially from said ring to form a sustaining rotor, tension members connected between adjacent supports for carrying the centrifugal load of said rotor, and bearing means for suspending said track from said ring and permitting relative rotation therebetween.

5. In a helicopter having a fuselage and an annular, channeled framing member on the fuselage and defining a horizontal rotor blade assembly-receiving chamber or housing, a rotor blade assembly supporting apparatus comprising a circular track secured to the outer edge of the housing, a rotor blade assembly supporting ring arranged for rotation in said housing and concentric with said track, bearing means for suspending said track from said ring and permitting relative rotation therebetween, a plurality of airfoil section blades extending radially from said supporting ring to form a sustaining rotor rotatable in a fixed horizontal plane with respect to the fuselage and subjacent thereto, and means for turning said blades about their individual spanwise axes for collectively and cyclically controlling the pitch thereof.

6. In an aircraft having a rotative wing structure mounted in the periphery of the fuselage, the said wing structure comprising a plurality of air foil section blades and a rotor mounting for same, the rotor supporting apparatus comprising a circular track secured in a peripheral channel in the body of the aircraft, a rotor blade assembly supporting ring arranged concentric with said track, bearing means for suspending said track from said ring and permitting relative rotation therebetween, a plurality of universals spaced circumferentially about said ring for supporting a plurality of airfoil section blades extending radially from said ring to form a sustaining rotor assembly, and means including universal connections for turning said blades about their individual spanwise axes to adjust the pitch thereof.

7. In a helicopter having a fuselage and a peripherally channeled housing or framing member for the fuselage and mounting a rotor blade assembly, a rotor supporting apparatus comprising a circular track secured in and to the framing member, a blade supporting ring in the housing of said framing member arranged concentric with said track, and a floating ring concentric with said track and said supporting ring carrying a plurality of rollers interposed between said track and supporting ring for suspending said track from said supporting ring and permitting relative rotation therebetween.

8. In an aircraft having a body portion, a control ring peripherally mounted in an annular frame surrounding said body portion, a plurality of airfoil section blades having their spanwise axes extending within the periphery of said body portion and radially intersecting the control ring, and means in the body coupling said blades to said control ring for turning said blades about their individual spanwise axes to control the pitch thereof according to the axial position of said ring with respect to said body portion.

9. In an aircraft having a body portion, a control ring peripherally mounted in an annular frame surrounding said body portion, a plurality of airfoil section blades having their spanwise axes extending within the periphery of said body portion and radially intersecting the control ring, means in the body coupling said blades to said control ring for turning said blades about their individual spanwise axes to control the pitch thereof according to the axial position of said ring with respect to said body portion, and pitch control means within said body portion for adjusting the axial position of said control ring.

10. In an aircraft having a body portion, a control ring peripherally mounted in an annular frame surrounding said body portion, a plurality of airfoil section blades having their spanwise axes extending within the periphery of said body portion and radially intersecting the control ring, means in the body supporting said blades for rotation about said body portion, and means coupling said blades to said control ring for turning said blades about their individual spanwise axes to control the pitch thereof according to the axial position of said control ring with respect to said body portion.

11. In an aircraft having a body portion, a control ring peripherally mounted in an annular frame surrounding said body portion, a plurality of airfoil section blades having their spanwise axes extending within the periphery of said body portion and radially intersecting the control ring, means in the body supporting said blades for rotation about said body portion, and lever means coupling said blades to said control ring for turning said blades about their individual spanwise axes to control the pitch thereof according to the axial position of said ring relative to said body portion.

12. In an aircraft having a body portion, a control ring peripherally mounted in an annular frame surrounding said body portion, a plurality of airfoil section blades having their spanwise axes extending within the periphery of said body portion and radially intersecting the control ring, means in the body supporting said blades for rotation about said body portion, and a lever coupled to the root of each of said blades and slidably connected to said control ring for turning said blades about their individual spanwise axes to control the pitch thereof according to the axial position of said control ring relative to said body portion.

13. In an aircraft having a body portion, a control ring peripherally mounted in an annular frame surrounding said body portion, a plurality of airfoil section blades having their spanwise axes extending within the periphery of said body portion and radially intersecting the control ring, means in the body supporting said blades for rotation about said body portion, means coupling said blades to said control ring for turning said blades about their individual longitudinal axes to control the pitch thereof according to the axial position of said control ring with respect to said body portion, and attitude control means within said body portion for changing the position of the axis of said control ring to cause cyclical variation of the pitch of said blades during their rotation about said body portion.

14. In an aircraft having a body portion, a control ring peripherally mounted in an annular frame surrounding said body portion, a plurality of airfoil section blades having their spanwise axes extending within the periphery of said portion and radially intersecting the control ring, means in the body supporting said blades for rotation about said body portion, means coupling said blades to said control ring for turning said blades about their individual spanwise axes to control the pitch thereof according to the axial position of said control ring with respect to said body portion, pitch control means within said body portion for adjusting the axial position of said control ring relative to said body portion for simultaneously adjusting the pitch of all of said blades, and attitude control means for changing the position of the axis of said control ring relative to the axis of rotation of said blades for cyclically varying the pitch of said blades during their rotation about said body portion.

15. In a helicopter, a housing comprised of a channeled framing member and a control ring in said housing adapted to be axially tiltable, a plurality of airfoil section blades having their spanwise axes radially intersecting the control ring, said blades forming a sustaining rotor adapted to be power-driven, means coupling said blades to said control ring for turning said blades about their individual spanwise axes to control the pitch thereof according to the axial position of said ring, releasable means for positioning and retaining said control ring in a power flight position, and a governor responsive to the power driving said sustaining rotor for maintaining said positioning means operative so that a power reduction will release said control ring to be positioned according to a preset autorotative pitch setting.

MORTIMER F. BATES.

REFERENCES CITED

The following references are of record in the file of this patent:

UNITED STATES PATENTS

| Number | Name | Date |
|---|---|---|
| 1,133,660 | Papin et al. | May 30, 1915 |
| 1,819,075 | Darr | Aug. 18, 1931 |
| 1,868,392 | Leffert | July 19, 1932 |
| 1,915,855 | Hess | June 27, 1933 |
| 1,919,089 | Breguet et al. | July 18, 1933 |
| 1,985,819 | Cierva | Dec. 25, 1934 |
| 2,085,359 | Hall | June 29, 1937 |
| 2,115,754 | Vaughn | May 3, 1938 |
| 2,209,879 | Focke | July 30, 1940 |
| 2,328,786 | Crowder | Sept. 7, 1943 |
| 2,350,129 | Pitcairn | May 30, 1944 |
| 2,382,460 | Young | Aug. 14, 1945 |
| 2,428,794 | Fiumedoro | Oct. 14, 1947 |